(12) United States Patent
Saubhasik et al.

(10) Patent No.: US 11,700,201 B2
(45) Date of Patent: Jul. 11, 2023

(54) MECHANISM TO ENFORCE CONSISTENT NEXT HOPS IN A MULTI-TIER NETWORK

(71) Applicant: Arista Networks, Inc., Santa Clara, CA (US)

(72) Inventors: Mayukh Saubhasik, Richmond (CA); Binglai Niu, Surrey (CA); Ajay Kini, Campbell, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 23 days.

(21) Appl. No.: 17/385,785

(22) Filed: Jul. 26, 2021

(65) Prior Publication Data

US 2023/0035984 A1 Feb. 2, 2023

(51) Int. Cl.
*H04L 45/74* (2022.01)
*H04L 12/66* (2006.01)
(Continued)

(52) U.S. Cl.
CPC .............. *H04L 45/74* (2013.01); *H04L 12/66* (2013.01); *H04L 45/24* (2013.01); *H04L 67/141* (2013.01); *H04L 45/04* (2013.01); *H04L 47/828* (2013.01); *H04L 49/602* (2013.01); *H04L 67/1089* (2013.01); *H04L 67/2885* (2013.01)

(58) Field of Classification Search
CPC ......... H04L 45/00; H04L 45/74; H04L 12/00; H04L 12/66; H04L 45/24; H04L 45/243; H04L 67/14; H04L 67/141; H04L 67/2866; H04L 2012/4629; H04L 49/602; H04L 2012/5618; H04L 65/00; H04L 65/1013; H04L 65/102; H04L 65/1033; H04L 65/1036; H04L 65/104; H04L 9/0827; H04L 41/044; H04L 41/065;
(Continued)

(56) References Cited

U.S. PATENT DOCUMENTS 7,609,637 B2 10/2009 Doshi
8,365,034 B2 1/2013 Kim
(Continued)

FOREIGN PATENT DOCUMENTS

| CN | WO 2014/180307 | * | 11/2014 | ........... H04L 12/703 |
| CN | WO 2021/136430 | * | 7/2021 | ........... H04L 12/729 |
| GB | WO 2004/036867 | * | 4/2004 | ............. H04L 29/06 |

OTHER PUBLICATIONS

Saha, Dola, et al., GRATIS: Free Bits in the Network, CU-CS-1075-10, Computer Science Technical Reports, 1004, Sep. 1, 2010, 24 pgs.

*Primary Examiner* — Warner Wong
(74) *Attorney, Agent, or Firm* — Sprinkle IP Law Group

(57) ABSTRACT

In general, the disclosure relates to a method for forwarding a packet through a multi-tier network by establishing a routing protocol session with network devices in the multi-tier network, obtaining routing protocol information from network devices of the multi-tier network, determining a group using the routing protocol information, generating an ordered group listing using network device identifiers (NDIs) for the network devices in the group, and programming a network device hardware of a network device of the set of network devices of the multi-tier network using the ordered group listing. The group includes a set of the network devices of the multi-tier network.

20 Claims, 5 Drawing Sheets

(51) Int. Cl.
  *H04L 45/24* (2022.01)
  *H04L 67/141* (2022.01)
  *H04L 47/70* (2022.01)
  *H04L 67/1087* (2022.01)
  *H04L 45/02* (2022.01)
  *H04L 49/60* (2022.01)
  *H04L 67/2885* (2022.01)

(58) Field of Classification Search
  CPC ..... H04L 47/782; H04L 47/828; H04L 45/04; H04L 61/5069; H04L 67/1089; H04L 67/2885
  See application file for complete search history.

(56) References Cited

U.S. PATENT DOCUMENTS

| | | | |
|---|---|---|---|
| 9,712,447 B2 | 7/2017 | Wood | |
| 10,257,080 B1* | 4/2019 | Kusam | H04L 45/12 |
| 11,240,355 B2 | 2/2022 | Siemens | |
| 2010/0293327 A1 | 11/2010 | Lin | |
| 2011/0060844 A1* | 3/2011 | Allan | H04L 45/12 |
| | | | 709/241 |
| 2012/0307832 A1* | 12/2012 | Allan | H04L 45/24 |
| | | | 370/400 |
| 2015/0304206 A1* | 10/2015 | Filsfils | H04L 45/46 |
| | | | 709/238 |
| 2016/0294693 A1 | 10/2016 | Cheng | |
| 2017/0222920 A1* | 8/2017 | Thu | H04L 45/16 |
| 2017/0324664 A1* | 11/2017 | Xu | H04L 12/4633 |
| 2018/0026880 A1 | 1/2018 | Nainar | |
| 2018/0213461 A1* | 7/2018 | Grayson | H04L 43/0882 |
| 2018/0324090 A1* | 11/2018 | Duncan | H04L 12/4641 |
| 2019/0238363 A1* | 8/2019 | Boutros | H04L 45/38 |
| 2019/0238364 A1* | 8/2019 | Boutros | H04L 45/745 |
| 2019/0288940 A1* | 9/2019 | Filsfils | H04L 45/74 |
| 2019/0386910 A1* | 12/2019 | Yang | H04L 45/02 |
| 2019/0394119 A1* | 12/2019 | Yang | H04L 45/745 |
| 2020/0007440 A1* | 1/2020 | Xu | H04L 45/22 |
| 2020/0067823 A1* | 2/2020 | Malhotra | G06F 9/45558 |
| 2021/0029021 A1* | 1/2021 | Torvi | H04L 45/02 |
| 2022/0103462 A1* | 3/2022 | Sidebottom | H04L 45/50 |
| 2022/0116488 A1 | 4/2022 | Siemens | |
| 2022/0191130 A1* | 6/2022 | Nainar | H04L 45/24 |

* cited by examiner

MECHANISM TO ENFORCE CONSISTENT NEXT HOPS IN A MULTI-TIER NETWORK

BACKGROUND

A communication system may enable devices to communicate with one another. The communication system may include devices that relay information from a sending device to a destination device.

Symmetrical networks (e.g., CLOS) can facilitate traffic load balancing among network devices (e.g., switches) that span across multiple links, headed for a destination prefix (e.g., Internet Protocol (IP) v4, IPv6 addresses). However, the next hops in an Equal Cost Multi-path (ECMP) forwarding equivalence class (FEC) data structure (also referred to as a FEC) for a destination prefix is typically unordered leading to inconsistent traffic hashing for a corresponding destination prefix across different network devices in a layer of the symmetric network topology. Unordered destination prefixes cause undesirable effects such as unpredictability among downstream layer network devices and load imbalance.

DETAILED DESCRIPTION

Figure 1:
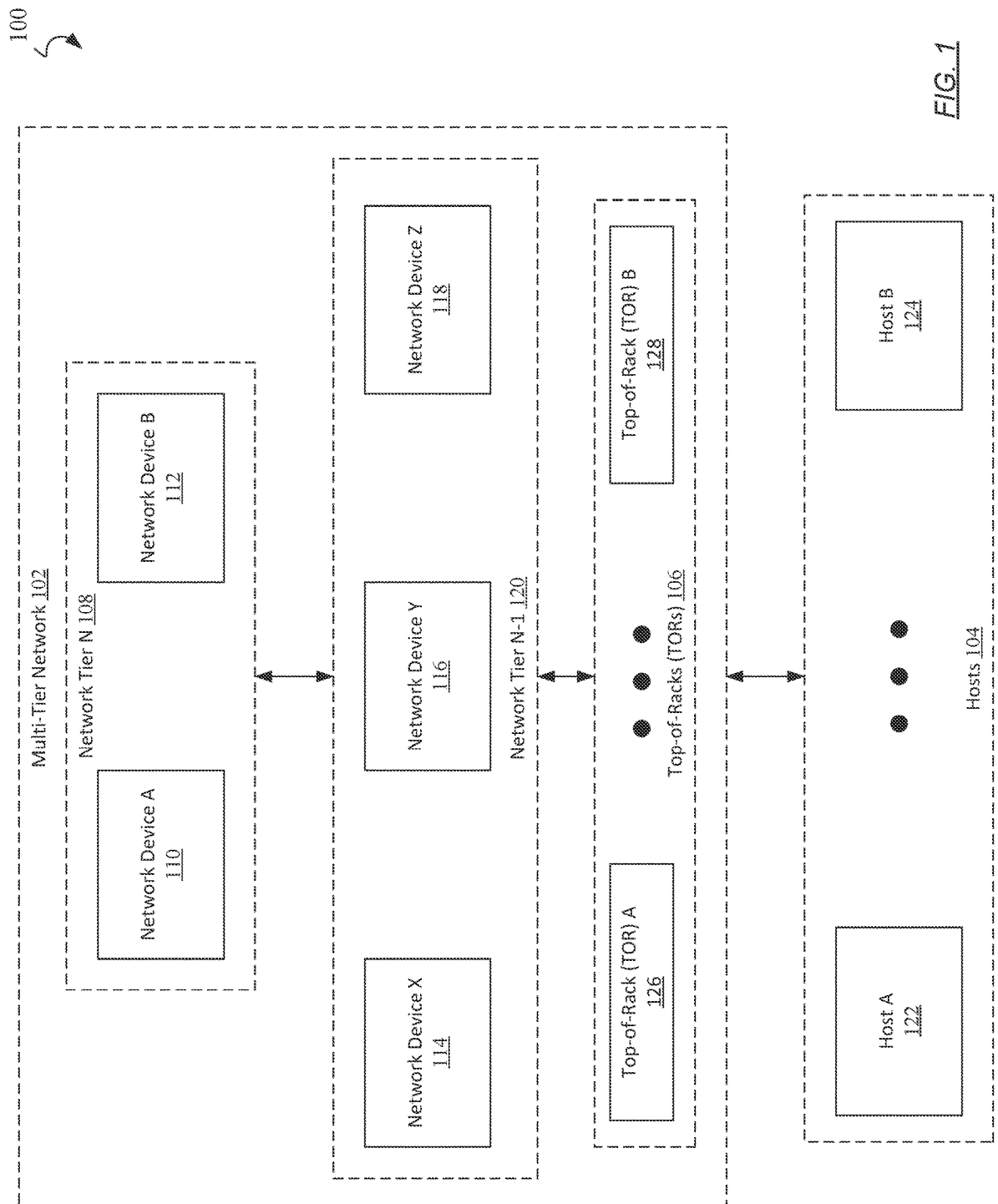
FIG. 1 shows an example system in accordance with one or more embodiments of the disclosure.

Routing protocols, such as Border gateway protocol (BGP) for equal cost multiple paths (ECMP) paths, in multi-tier networks, are less predictable when network devices are initialized or start up. For example, in a tiered network topology, devices in a higher tier of the network may have the same set of next hop devices (also referred to as an ECMP group) in the lower tier of the network for a particular destination prefix. Accordingly, packets for a given destination prefix that are traversing through (or originating from) network devices from a top tier of a network may end up at different devices (all of which are part of the ECMP group) in an adjacent lower tier of the network. This ordering inconsistency of the packet next hop in the various network layers, when routing or forwarding the packet inter-network, is not only inefficient, additionally, it can be exacerbated in the face of a transient interface link-flap event—an event that causes inoperability and immediate restart of a Layer 3 interface. Such an event can cause a next hop in an ECMP group to be deleted and added back to a forwarding equivalence class (FEC) but at a different position in the ECMP group therefore resulting in yet an additional indeterministic ordering of next hops.

As earlier discussed, a transient interface link-flap event, a restart event, or a failure event may cause a corresponding link to become inoperable for a period of time and then resume operation. Existing traffic flows may have a destination prefix that takes different paths with the same set of next hops before and after a link-flap, restart, or failure event in steady state, i.e., no link is no longer operational. That is, where hashing algorithms are employed by application specific integrated circuits (ASICs) of a networking device to select a next hop from the set of next hops in the ECMP group, the ultimate selection of a particular next hop from the set of next hops in the ECMP group is a function of the order of the next hops in the ECMP group. As such, two network devices in the same tier that are using the same hashing algorithm and that have the same next hops for a given destination prefix but with different orderings of the next hops will forward network traffic for the same destination prefix to different next hops within the ECMP group.

To address some or all of the foregoing limitations, a deterministic and consistent next hop ordering approach is presented in a multi-tier network to achieve a consistent path through the network topology for a given flow despite the number of tiers in the network. In one embodiment of the disclosure, a flow is a set of Internet Protocol (IP) packets passing an observation point in the network during a certain time interval. All packets belonging to a particular flow have a set of common properties e.g., (i) one or more packet header field(s) (e.g., destination IP address), transport header field (e.g., destination port number), or application header field (e.g., real-time transport protocol (RTP) header fields); (ii) one or more characteristics of the packet itself (e.g., number of multi-protocol label switching (MPLS) labels, etc.), and/or (iii) one or more of the fields derived from packet treatment (e.g., nexthop IP address, the output interface, etc.). A packet is defined to belong to a flow if it satisfies all of the defined properties of the flow.

Continuing with the discussion of the disclosure, the deterministic approach, in one or more embodiments, provides a consistent ordering by enforcing an ordering of next hops within a given ECMP group. Thus, in one or more embodiments, two network devices on the same tier with their own ECMP groups that have the same set of next hops will have the same ordering of next hops within their respective ECMP groups. The deterministic order of the next hops within the ECMP groups is based on unique network device identifiers (NDI) for network devices (i.e., the next hops) (i.e., identifiers that uniquely identify the network device in the network). Subsequently, the ordering is enforced by the network device hardware.

In some embodiments, the unique device identifier is a network device identifier (NDI) configured under a routing protocol instance, such as, without limitation, a BGP instance, and employed as a network-wide unique identifier for a network device in the corresponding network. In one or more embodiments of the disclosure, a NDI is a router identifier. The NDI may be referred to as routing protocol information and may be exchanged as part of a routing protocol open message negotiation when a routing protocol session is initially established. The next hops within a given ECMP group may be sorted on the basis of the NDI of the routing protocol peer or neighbor from which the path is received yielding a consistent and deterministic order of paths in an ECMP group.

While BGP is referenced in the discussions to follow as an example routing protocol, various embodiments of the disclosure are not limited to a specific routing protocol, such as the BGP, and can apply to any type of network device with routing capability that can communicate an associated unique NDI identifying the device to the network in which the network device resides and where the NDI is made available to the remaining devices in the network through the network device communication.

In some embodiments and methods of the disclosure, as discussed above, the next hop ordering is enforced down to the hardware level of a multi-tier network device. For example, ordered next hops are programmed and represented by processing routing information obtained from other routers of the network through different protocols, and in some cases the information from client configuration, to construct the next hop based on a desired ordering of next hops. The next hop, with ordered next hops, may be passed through universal communication interfaces to a network device hardware layer for programming the ports of the network device (e.g., switch) according to the ordered next hops. Specifically and without limitation, bitmaps may be used to preserve the position of each next hop.

In embodiments that use bitmaps, a distinct bitmap may be associated with each next hop in the ECMP group, where the bitmap specifies the relative position of the next hop to the other next hops in the ECMP group. For example, consider a scenario in which there are four next hops in an ECMP group—N1, N2, N3, N4 and further assume that the ordering is N1, N3, N4, N2. In this example, the bitmap may be represented using four bits, where the left most bit corresponds to position one (i.e., the position with the highest order) and the right most bit corresponds to position four (i.e., the position with the lowest order). Accordingly, N1, which is in the first position, is associated with a bitmap of "1000"; N2, which is in the four position, is associated with a bitmap of "0001"; N3, which is in the second position, is associated with a bitmap of "0100"; and N4, which is in the third position, is associated with a bitmap of "0010". Other methods for encoding the ordering of the ECMP group members may be used without departing from the disclosure.

In one embodiment of the disclosure, the bitmaps may be constructed and passed to the network device hardware, where the network device hardware uses the bitmaps to dictate how to program the network device hardware in a manner that preserves the provided next hop ordering.

Various embodiments of the disclosure are described below.

Turning to the figures, FIG. 1 shows an example system in accordance with one or more embodiments of the disclosure. The system (100) includes a multi-tier network (102) communicatively coupled to one or more hosts (104). In an example implementation and without any limitations, the system (100) may be a call center.

The multi-tier network (102) includes network tier N (108) and network tier N−1 (120). The network tier N (108) includes network device A (110) and network device B (112) and the network tier N−1 (120) includes network device X (114), network device Y (116), and network device Z (118). The multi-tier network (102) further includes top-of-rack switches (ToRs) (106) communicatively coupled to the network tier N−1 (120), which is in turn coupled to the network tier N (108). The ToRs (106) includes one or more ToRs, e.g., ToR A (126) and ToR B (128). In an embodiment of the disclosure and without limitation, each of the ToRs A (126) and B (128) is a network device that is directly coupled to one or more hosts of the hosts (104) and further directly coupled to network devices of an immediately higher level-positioned network tier (e.g., network tier N−1 (120)). For example, the ToR A (126) may be coupled to host A (122) and network device X (114) and ToR B (128) may be coupled to host B (124) and network device Z (118).

In one or more embodiments of the disclosure, each of the ToRs A (126) and B (128) may be configured as a switch, and the one or more of the hosts 104, host A (122) and host B (124) may each be configured as a server. The network devices (110)-(118) operate independently of one another, but they employ a common hashing mechanism and independently implement the method shown in FIG. 3 to achieve the same ECMP group next hop ordering, as described above.

In one or more embodiments, the aforementioned network devices communicate with each other using BGP. The communication includes identifying information associated with each network device. In an embodiment of the disclosure, the network devices exchange routing information among each other, for example, during a BGP or another type of routing protocol. For instance, network device A may obtain the NDI for network devices X, Y, and Z. The network device A may additionally obtain the route or prefix, which points to the next hops associated with the network devices X, Y, Z. Network device A may use this information to: (i) establish an ECMP group that includes network devices X, Y, and Z and (ii) use the NDI associated with each of the aforementioned network devices to generate an ordering of the aforementioned network devices within the ECMP group. Network device A may then enforce the determined ordering of the next hops (i.e., of the network devices in the ECMP group) by programming the network device hardware in a manner that preserves the determined ordering. In some embodiments of the disclosure, the ordering of the next hops in the ECMP group is performed by arranging the network devices in a specific order, for example, in descending NDI order (i.e., from highest NDI to lowest NDI). Embodiments of the disclosure are not limited to a descending order of the next hops in the ECMP group.

Following the aforementioned ordering, when network device A receives a packet, it performs a lookup and matches the packet to an ECMP group in the network device hardware. A hashing function (or algorithm) is then used to select the specific next hop within the identified and ordered ECMP group. Once the next hop is selected, the packet is forwarded out of an appropriate egress port on the network device to the selected next hop.

In some embodiments of the disclosure, the multi-tier network (102) is generally a network that may be the medium through which the hosts (104), the network devices (110)-(118), and ToRs (106) are operatively connected. In one embodiment of the disclosure, the multi-tier network (102) may include one or more other network devices (or systems) (not shown) that facilitate communication between the aforementioned components. As such, in one embodiment of the disclosure, the network may include any combination of local and/or wide area (e.g., Internet) network segments that may be wire-based and/or wireless and that may use any combination of wired and/or wireless communication protocols. In the interest of simplicity of illustration and without limitation, the multi-tier network (102) is presumed to include a single network.

In some embodiments of the disclosure, the network devices of the network tier N (108) are considered situated at a higher tier level than the network devices of the network tier N−1 (120) and the ToRs (106). That is, network traffic is considered to travel on a path from the hosts (104) up to the ToRs (106), to the network tier N−1 (122), and ultimately to the network tier N (108). The network devices of the network tier N (108) need not be situated at a higher tier level than the network devices of the network tier N−1 (122) and the ToRs (106). In the interest of clarity of illustration, the network devices of the network tier N (108) are considered situated at a higher tier level than the network devices of the network tier N−1(120) and the ToRs (106) in the discussions and figures to follow.

Similarly, in some embodiments of the disclosure, the network devices of the network tier N−1 (120) are considered situated at a higher tier level than the network devices of the ToRs (106). The network devices of the network tier N−1 (120) need not be situated at a higher tier level than the ToRs (106). In the interest of clarity of illustration, the network devices of the network tier N−1 (120) are considered situated at a higher tier level than the ToRs (106) in the discussions and figures to follow.

In some embodiments of the disclosure, the network devices of a network tier may be coupled to one or more neighboring network devices of the same tier and one or more network devices of a different tier. For example and without limitation, the network device A (110) may be operatively coupled to its neighboring network device B (112) and it may be further operatively coupled to the network device X (114).

In one embodiment of the disclosure, each of the network devices A (110), B (112), X (114), Y (116), and Z (118) of the multi-tier network (102) is a physical or virtual device that may be used for performing various embodiments of the disclosure. The physical device may correspond to any physical system with functionality to implement one or more embodiments of the disclosure. In one or more embodiments, each of the network devices is a physical device that includes persistent storage, memory (e.g., random access memory), one or more processor(s), and two or more physical ports that may be a combination of ingress and egress ports. The virtual device is software that is executing on a physical device(s). From the perspective of entities that are interacting with the virtual device, the virtual device appears to be a physical device. Non-limiting examples of virtual devices are virtual machines, containers, and virtual switches.

In one embodiment of the disclosure, each of the network devices includes executable instructions (stored in a non-transitory computer readable medium (not shown)), which when executed, enable the network device to perform one or more methods described throughout this application.

In one embodiment of the disclosure, the network device may include persistent storage. The persistent storage in the network device may include any type of non-transitory computer readable medium that includes instructions, which, when executed by one or more processor(s) in the network device, enable the network device to perform all or a portion of the functions described in accordance with one or more embodiments of the disclosure.

Examples of a network device include, but are not limited to, a router, a switch, and a multilayer switch. The network device is not limited to the aforementioned specific examples. Additional detail about a network device is described below with respect to FIG. 2.

In some embodiments of the disclosure, each of the hosts (e.g., host A (122), host B (124)) may be a host system including one or more computing devices functionally equipped to receive network traffic from directly coupled network devices of the multi-tier network (102) after the network traffic is forwarded to such network device from a higher level network device in the multi-tier network (102). For example, the host may receive a packet from ToR A (126), which has received the packet from Network Device Y (116).

In one embodiment of the disclosure, each of the hosts (104) is a physical or virtual device that may be used for facilitating performing various embodiments of the disclosure. The physical device may correspond to any physical system with functionality to implement one or more embodiments of the disclosure. For example, the physical device may be a personal computer, a laptop, a smartphone, or a tablet (i.e., a device with at least one or more processor(s), memory, and an operating system) that is directly or otherwise connected to a network device (e.g., one of the ToRs (106)).

Alternatively, the physical device may be a special purpose computing device that includes one or more application-specific processor(s) (or hardware) configured to execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment of the disclosure, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

In one embodiment of the disclosure, each of the hosts (104) includes executable instructions (stored in a non-transitory computer readable medium (not shown)), which when executed, enable the corresponding host to perform the functionality of hosts that are described throughout this disclosure. Further details of a host is shown below in FIG. 5.

While FIG. 1 shows a particular system architecture, the disclosure is not limited to the system architecture shown in FIG. 1. For example, while FIG. 1 shows two sets of network devices, one set of ToRs, and one set of hosts, implementations of the disclosure may include one or more of each of the aforementioned elements without departing from the disclosure. Further, while FIG. 1 shows a multi-tiered network with three tiers, the multi-tiered network may have additional tiers without departing from the disclosure.

Figure 2:
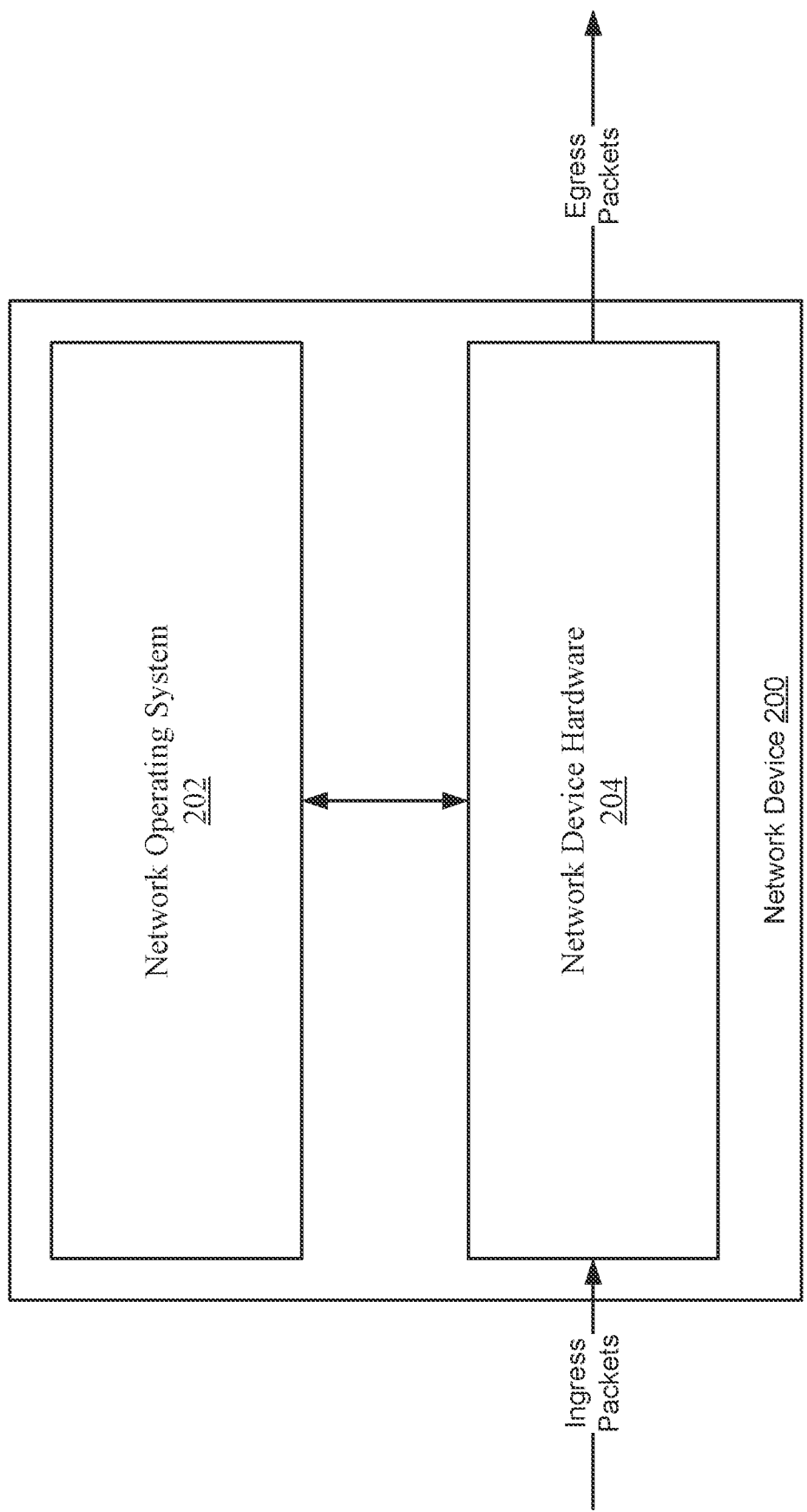
FIG. 2 shows a diagram of a network device in accordance with one or more embodiments of the disclosure.

FIG. 2 shows a diagram of a network device in accordance with one or more embodiments of the disclosure. The network device (200) includes a network operating system (202) and a network device hardware (204) operatively coupled to one another. In one embodiment of the disclosure, the network device (200) is a physical or virtual device that may be used for performing various embodiments of the disclosure. The physical device may correspond to any physical system with functionality to implement one or more embodiments of the disclosure.

In one embodiment of the disclosure, the network device hardware (204) of the network device (200) may be one or more physical components (e.g., ports, memory, integrated circuits, etc.) to enable the network device to: (i) receive ingress packets at one or more ingress ports from hosts (e.g., 104, FIG. 1), (ii) generate and enforce the deterministic ordering of next hops for the packet as discussed in FIG. 3, and (iii) process the packets, using the network device hardware programmed in accordance with FIG. 3.

As discussed above, in one embodiment of the disclosure, the network device hardware (204) includes one or more physical components that are used to receive packets and then process the received packets. More specifically, the network device hardware further includes functionality to analyze the receive packets and, based on the analysis: (i) drop the packet, (ii) forward the packet towards an appropriate next hop, or (iii) send the packet (or at least the payload of the packet) to the network operating system to process.

In one embodiment of the disclosure, the network device hardware may also include persistent storage. The persistent storage may include any type of non-transitory computer readable medium that includes instructions, which, when executed by one or more processor(s) in the network device, enable the network device to perform all or a portion of the functions described in accordance with one or more embodiments of the disclosure (see e.g., FIG. 3).

Figure 3:
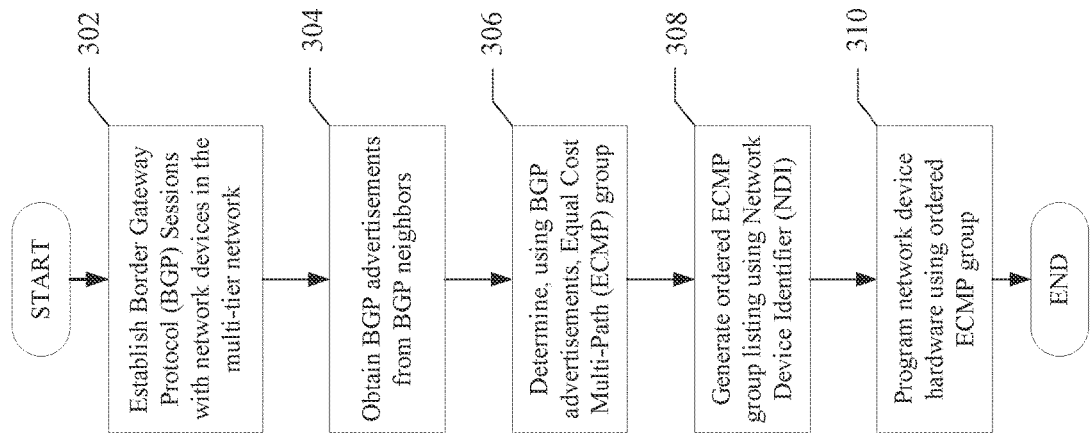
FIG. 3 shows a method for programming a network device in a multi-tier network in accordance with one or more embodiments of the disclosure.

The network operating system (202) of the network device (200) is computer executable code, which when executed by a processor (not shown) on the network device, includes functionality to perform and/or orchestrate all or a portion of the method shown in FIG. 3.

FIG. 3 shows a method for programming a network device in a multi-tier network in accordance with one or more embodiments of the disclosure. The method of FIG. 3 may be performed by, for example, a network device (e.g., 110, FIG. 1). Other components illustrated in FIGS. 1-2 may perform the method of FIG. 3 without departing from embodiments of the disclosure.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

At step 302, the network device establishes Border Gateway Protocol (BGP) sessions (or more generally a routing protocol sessions) with other network devices (e.g., 110-118, FIG. 1) in the multi-tier network (e.g., 102, FIG. 1). During the establishment of a BGP session with a BGP neighbor, the network device receives the NDI associated with the BGP neighbor. At step 304, the network device, after establishing the appropriate sessions in step 302, obtains BGP advertisements from BGP neighbors (e.g., 110-118, FIG. 1).

At step 306, the network device determines, based on the BGP advertisements, that two or more of the network devices in a lower tier (i.e., a lower tier relative to the network device that is performing the method of FIG. 3), may be grouped into an ECMP group. Based on this determination, the network device generates an ECMP group that includes at least the identified two or more network devices. At this stage, the ECMP group members are known; however, the network device has not generated an ordering of the ECMP group members.

At step 308, the network device generates an ordered ECMP group listing using network device identifiers (NDI) for the ECMP group generated in Step 306. In an embodiment of the disclosure, generating the ordered ECMP group listing includes: (i) obtaining (or identifying) an NDI for each of the ECMP group members, and (ii) generating an ordered list of ECMP group members based on their NDIs. The NDIs may be ordered in ascending or descending order. The NDIs may be ordered using another deterministic ordering scheme without departing from the disclosure. Said another way, the method shown in FIG. 3 is intended to be performed independently by two or more network devices in a given tier of the multi-tier network using the NDIs (which are known network wide) of the ECMP group members. To that end, any ordering scheme may be used provided that two or more network devices that use the ordering scheme can independently generate the same ordered ECMP group listing.

Continuing with the discussion of FIG. 3, at step 310, the network device hardware (e.g., 204, FIG. 2) is programmed using the ordered ECMP group listing. Following step 310, the network device processes packets using the programmed network device hardware.

In one embodiment of the invention, the network operating system (or an agent executing thereon) generates the ordered ECMP group listing and then initiates the programming of the network device hardware. In order to enforce the ordering dictated by the ordered ECMP group listing, the network operating system (or an agent executing thereon) generates one or more data structures (e.g., one or more bitmaps) and then provides the one or more data structures to the network device hardware. The network device hardware may then take the appropriate steps, using the one or more data structures, to program the network device hardware to include the ECMP groups and to enforce the ordering of the ECMP groups in the network device hardware.

While the disclosure has been described with respect to ECMP groups, embodiments of the disclosure may be extended to scenarios in which the network device include unequal cost multi-path (UCMP) group.

UCMP extends the concept of ECMP by adding weights to the next hops within the UCMP group, thereby preferentially steering flows to the next hops in the UCMP group that have the higher weights. In one or more embodiments of the disclosure, if network devices on the same tier within the multi-tier network are implementing UCMP, the ordering in the ordered ECMP group listing (which may now be referred to as the ordered UCMP group listing) may be enforced by, for example, modifying the per next hop bitmaps as described in the example scenario below. Other methods for encoding the ordering of the UCMP group members may be used without departing from the disclosure.

For example, consider a scenario in which there are four next hops—N1, N2, N3, N4—in a UCMP group, where the next hops have the following weights N1=3, N2=2, N3=1, N4=4. Further, assume that the ordering, based on the NDI associated with each of the aforementioned next hops, is as follows: [N2, N1, N3, N4]. In order to enforce the aforementioned ordering and take into account the per next hop weights, a bitmap with a length equal to the sum of the weights may be used to encode the next hop ordering (i.e., ten bits in this example (3+2+1+4)) and the number of bits set for each next hop in the bitmap is equal to its weight. Based on the above, Table 1 shows the per next hop bitmaps for N1-N4.

TABLE 1

Next Hop Bitmap under UCMP example

| Next Hop (Listed in Descending NDI Order) | Bitmap |
|---|---|
| N2 | [1100000000] |
| N1 | [0011100000] |
| N3 | [0000010000] |
| N4 | [0000001111] |

In one or more embodiments of the disclosure, the result of using the aforementioned bitmap scheme is an UCMP group that is encoded in the network device hardware using ten slots. Thus, when the header (or portion thereof) of a packet that has a prefix that matches the UCMP group is hashed, the resulting hash value is used to select between one of ten slots. Because the slots are ordered and allocated based on the NDIs and the next hop weights, (i) packets with the same flow are directed to the same slot and ultimately the same next hop and (ii) if the hashing function evenly distributes flows across the ten slots, then flows will be preferentially directed to next hops with higher weights as these next hops are allocated to a relatively larger number of slots in the network device hardware. For example, because N4 has a weight of four and N3 has a weight of one, four times as many flows should be directed to N4. Those skilled in the art will appreciate that the disclosure is not limited to the aforementioned example.

In one or more embodiments of the invention, the weights associated with nexthops in a UCMP implementation may be rebased so that they do not have a common divisor. For example, if the weights for the next hops are 10 and 20, then the weights may be rebased to 1 and 2. Once the weights are rebased, the rebased weights may then be used to generate the nexthop bitmaps in the same manner as discussed above. The rebasing may enable a more efficient use of hardware resources.

EXAMPLE

Figure 4:
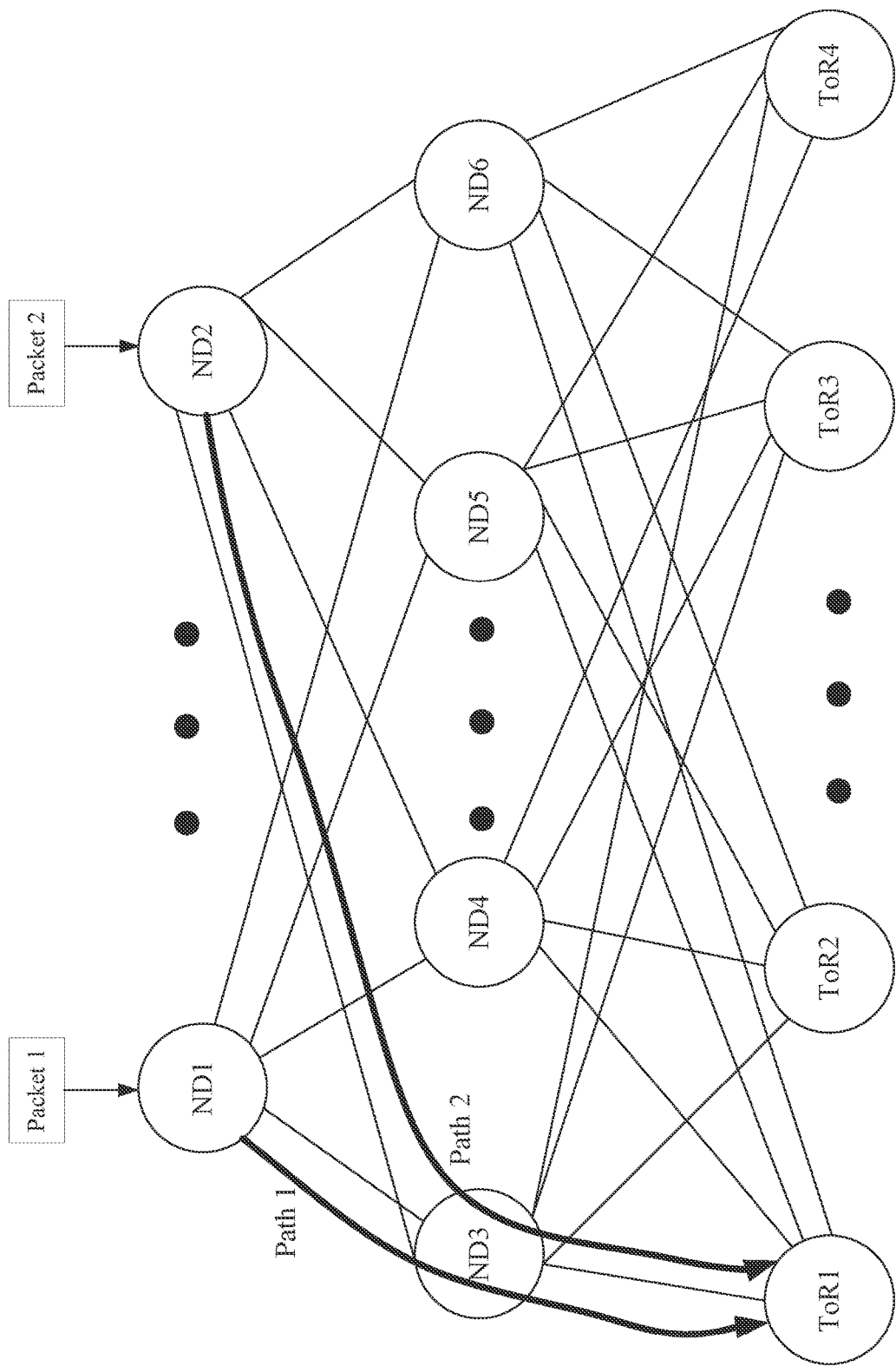
FIG. 4 shows an example in accordance with an embodiment of the disclosure.

FIG. 4 shows an example in accordance with one or more embodiments of the disclosure. The example is not intended to limit the scope of the disclosure; rather, the example is intended to illustrate various aspects of the disclosure.

Turning to the example, consider a scenario in which there is a multi-tier network that includes the ten network devices, which are denoted by the following network device identifiers—ND1, ND2, ND3, ND4, ND5, ND6, ToR1, ToR2, ToR3, ToR4. Further, in this example, assume that network devices ND1-ND2 implement the method shown in FIG. 3. More specifically, in this example, ND1 is directly connected to ND3-ND6, and ND2 is directly connected to ND3-ND6. Accordingly, for ND1, there is a first ECMP group of ND3-ND6, which is ordered as follows [ND3, ND4, ND5, ND6] (using the method shown in FIG. 3) and, similarly, for ND2, there is a second ECMP group of ND3-ND6, which is ordered as follows [ND3, ND4, ND5, ND6] (using the method shown in FIG. 3). ND1 and ND2 each independently perform the method shown in FIG. 3 and generate the same ordering for the first and second ECMP groups, respectively, Continuing with the example, because the first and second ECMP groups are ordered in the same manner, the packets for a given flow will be forwarded to the same next hop regardless of which network device (i.e., N1 or N2) receives the packet associated with the flow.

For example, consider how packets 1 and 2 are processed by the ND1 and ND2, respectively. With respect to packet 1, at the first time, packet 1 of the flow is received by ND1. Based on the processing of the header of packet 1, packet 1 is associated with the first ECMP group. Further, once the ECMP group is identified, ND1 subsequently hashes at least a portion of the header of packet 1 to select the first ordered next hop in the ECMP group (i.e., ND3), ND1 subsequently transmits the packet to ND3.

With respect to packet 2, at a second time, packet 2 of the flow (i.e., the same flow with which packet 1 is associated) is received by ND2. Based on the processing of the header of packet 2, packet 2 is associated with the second ECMP group. Further, once the ECMP group is identified, ND2 subsequently hashes at least a portion of the header of packet 2 to select the first ordered next hop in the ECMP group (i.e., ND3), ND2 subsequently transmits the packet to ND3.

As shown in this example, by ordering the members in the ECMP groups in a consistent manner in network devices on the same tier in a multi-tier network, the packets for a given flow that are received at a particular level in the multi-tier network are directed to the same next hop in an adjacent tier of the multi-tier network regardless of which network device (e.g., ND1 or ND2) receives the packet.

End of Example

While the above disclosure focuses on ordering of next hops groups (e.g., ECMP groups and UCMP groups) in network devices implementing a single level (i.e., non-hierarchical) forward equivalence class (FEC) data structure, the disclosure may also be implemented in network devices that include hierarchical FEC data structure.

In a multi-tiered network, the methods in this disclosure preserve the next tier device ordering even when the next hop of a route has hierarchy, i.e., some of the next hops in the ECMP group of a route are not directly connected next hops. For example, one of the ECMP next hops of a route can be resolved over another route, which has yet another set of ECMP next hops (which are referred to as next level next hops). The hierarchical FEC can be converted to a flattened FEC by combining the next hops of a current level FEC with the next hops of the next level FEC. By flattening, all the finally resolved next hops are placed in the same ECMP group. To maintain the ordering, methods and systems of the disclosure construct a bitmap, or another type of data structure, per nexthop, in the interface layer of a network device, as if the next level next hops are inserted into the original next hops from the position set for the next level FEC in the bitmap. In some cases, even if the same next hop appears in both the current level next hop and the next level next hop, the same next hop is given a different bit position in the flattened bitmap to preserve next level ordering. For further information regarding flattening of a hierarchical network, the reader is directed to U.S. application Ser. No. 16/416,132, filed on May 17, 2019, and titled "Mechanism To Preserve Nexthops", the disclosure of which is incorporated by reference in its entirety.

The following is a non-limiting example of preserving the ordering of nexthops when implementing a hierarchical FEC. The example is not intended to limit the disclosure or the claims.

Turning to the example, consider a scenario in which there is first FEC (i.e., FEC A) that has the following nexthops: N1, FECB, N2. Further, FEC B (i.e., another FEC in the FEC hierarchy) has the following nexthops: N2, N3. In this scenario assume that the ordering of the nexthop (as described above in FIG. 3) results in the following order for FEC A: N1, FECB, N2. Thus, the bitmaps created for the FEC A ordering are N1: [100], FECB: [010], N2 [001]. With respect to FEC B assume the ordering is N3, N4. When FEC B is flattened, the relative order of N3 and N4 are preserved and the order of N1, FEC B, and N2 are preserved. Thus, after the flattening, the order is N1, N3, N4, N2. Thus, the final bitmaps are N1: [1000], N2: [0001], N3: [0100], N4: [0010].

Figure 5:
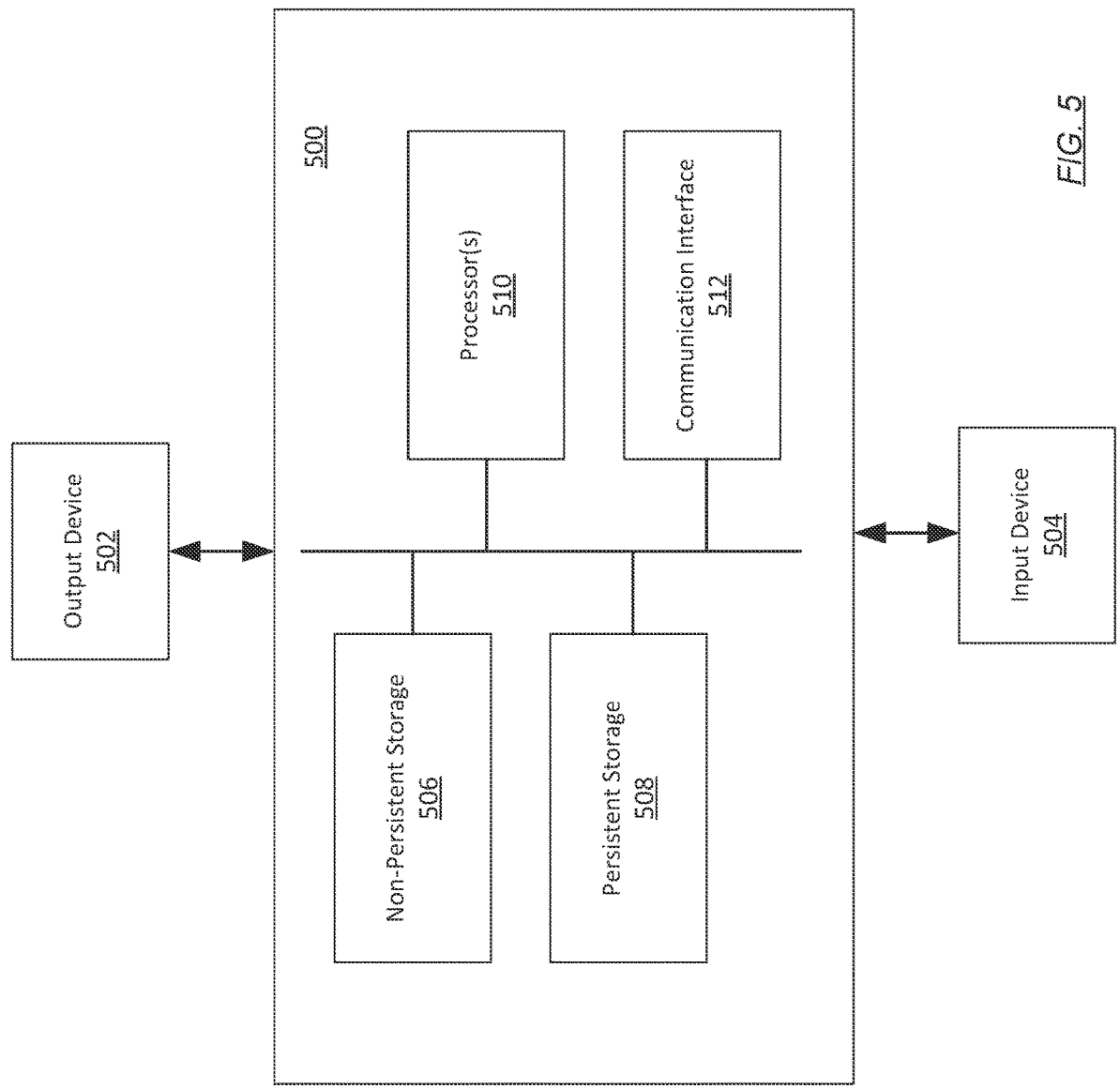
FIG. 5 shows an example host in accordance with one or more embodiments of the disclosure.

As discussed above, embodiments of the disclosure may be implemented using computing devices. FIG. 5 shows a diagram of a host (also referred to as a computing device) in accordance with one or more embodiments of the disclosure. The computing device (500) may include one or more computer processors (510), non-persistent storage (506) (e.g., volatile memory, such as random access memory (RAM), cache memory), persistent storage (508) (e.g., a hard disk, an optical drive such as a compact disk (CD) drive or digital versatile disk (DVD) drive, a flash memory, etc.), a communication interface (512) (e.g., Bluetooth® interface, infrared interface, network interface, optical interface, etc.), input devices (504), output devices (502), and numerous other elements (not shown) and functionalities. Each of the components illustrated in FIG. 5 is described below.

In one embodiment of the disclosure, the computer processor(s) (510) may be an integrated circuit for processing instructions. For example, the computer processor(s) may be one or more cores or micro-cores of a processor. The computing device (500) may also include one or more input devices (504), such as a touchscreen, keyboard, mouse, microphone, touchpad, electronic pen, or any other type of input device. In some embodiments, the computer processor (510) executes computer readable program code from persistent storage (e.g., 508) to perform the methods described herein (e.g., FIG. 3) Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the disclosure, the computing device (500) may include one or more output devices (502), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (510), non-persistent storage (506), and persistent storage (508). Many different types of computing devices exist, and the aforementioned input and output device(s) may take other forms.

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method of providing consistent next hop ordering when forwarding packets through a multi-tier network, the method comprising:
   establishing, by each of a set of network devices in a first tier of the multi-tier network, a routing protocol session with other network devices in the multi-tier network;
   obtaining, after the establishing, routing protocol information from the other network devices of the multi-tier network;
   determining, by each of the set of the network devices in the first tier of the multi-tier network, using the routing protocol information, a group of the network devices in a second tier of the multi-tier network;
   generating, by each of the set of the network devices in the first tier of the multi-tier network, a deterministic ordered group listing using network device identifiers (NDIs) for the network devices in the group of network devices; and
   programming, by each of the set of the network devices in the first tier of the multi-tier network, corresponding network device hardware of each of the set of the network devices using the ordered group listing.

2. The method of claim 1, further comprising,
   forwarding, using the programmed network device hardware, a packet from the at least one network device to a second network device, wherein the at least one network device is situated at a first tier of the multi-tier network and the second network device is situated at a second tier of the multi-tier network, wherein the first tier is a higher tier than the second tier.

3. The method of claim 1, wherein the routing protocol session is a border gateway protocol (BGP) session.

4. The method of claim 3, wherein the network devices from which routing protocol information is received are BGP neighbors of the network device.

5. The method of claim 1, wherein the NDIs comprise router identifiers.

6. The method of claim 1, wherein the ordered group listing specifies the group of the network devices in descending order of associated NDIs.

7. The method of claim 1, wherein the ordered group listing is encoded into a plurality of bitmaps, wherein each of the bitmaps is associated with one of the group of network devices.

8. The method of claim 1, wherein the group of network devices is an equal cost multi-path (ECMP) group.

9. The method of claim 1, wherein the group of network devices is an unequal cost multi-path (UCMP) group.

10. A non-transitory computer readable medium comprising computer readable program code, which when executed by a processor on a network device enables the network device to perform a method of providing consistent next hop ordering when forwarding packets through a multi-tier network, the method comprising:
    determining, using routing protocol information obtained from network devices in a multi-tier network, a group of next hops of the network device, wherein each next hop in the group of next hops is a network device in a second tier of a multi-tier network, wherein the network device is in a first tier of the multi-tiered network;
    generating, by the network device in the first tier of the multi-tier network, a deterministic ordered group listing using network device identifiers (NDIs) associated with the group of next hops;
    programming a network device hardware of the network device in the first tier of the multi-tier network using the ordered group listing; and
    forwarding, using the programmed network device hardware in the first tier of the multi-tier network, a packet received by the network device in the first tier of the multi-tier network to a next hop determined by the ordered group listing.

11. The non-transitory computer readable medium of claim 10, wherein the routing protocol information is obtained from a border gateway protocol (BGP) session.

12. The non-transitory computer readable medium of claim 11, wherein the network devices from which routing protocol information is received are BGP neighbors of the network device.

13. The non-transitory computer readable medium of claim 11, wherein at least one of the NDIs is a router identifier.

14. The non-transitory computer readable medium of claim 11, wherein the ordered group listing orders the next hops in the group of next hops based on an ascending order of network device identifiers associated with each of the next hops.

15. The non-transitory computer readable medium of claim 11, wherein the ordered group listing is encoded into a plurality of bitmaps, wherein each of the bitmaps is associated with one of the network devices in the group.

16. The non-transitory computer readable medium of claim 15, wherein the plurality of bit maps are used to program the network device hardware.

17. The non-transitory computer readable medium of claim 15, wherein the group of next hops is an equal cost multi-path (ECMP) group or an unequal cost multi-path (UCMP) group.

18. A network device in a first tier of a multi-tier network for providing consistent next hop ordering when forwarding a packet through the multi-tier network, comprising:
    a persistent storage that stores instructions; and
    a processor that when executing the instructions performs:
    establishing a routing protocol session with each of the network devices in the multi-tier network to obtain routing protocol information and unique identifiers for the network devices of the multi-tier network;
    determining, using the routing protocol information, a group of next hops of the network device in the first tier of the multi-tier network, wherein each next hop in the group of next hops is one of the network devices in a second tier of the multi-tier network;
    generating, by the network device in the first tier of the multi-tier network, a deterministic ordered group listing using the unique identifiers associated with the group of next hops; and
    programming a network device hardware of the network device in the first tier of the multi-tier network using the ordered group listing.

19. The network device of claim 18,
    wherein the ordered group listing is encoded into a plurality of bitmaps, wherein each of the bitmaps is associated with one of the network devices in the group; and
    wherein the plurality of bitmaps are used to program the network device hardware.

20. The network device of claim 18, wherein the group of next hops is an equal cost multi-path (ECMP) group or an unequal cost multi-path (UCMP) group.

* * * * *